United States Patent [19]
Lindén

[11] Patent Number: 5,950,315
[45] Date of Patent: Sep. 14, 1999

[54] LOPPER

[75] Inventor: Erkki Olavi Lindén, Billnäs, Finland

[73] Assignee: Fiskars Consumer OY AB, Billnas, Finland

[21] Appl. No.: 08/908,664

[22] Filed: Aug. 7, 1997

[51] Int. Cl.$^6$ .................................................. B26B 13/06
[52] U.S. Cl. ............................................. 30/249; 30/188
[58] Field of Search ....................... 30/249, 231, 188–190

[56] References Cited

U.S. PATENT DOCUMENTS

| | | | |
|---|---|---|---|
| 82,868 | 10/1868 | Parks . | |
| 87,719 | 3/1869 | Stark . | |
| 111,106 | 1/1871 | Calder . | |
| 379,359 | 3/1888 | Bosch | 30/249 |
| 425,820 | 4/1890 | Nelson . | |
| 427,112 | 5/1890 | Reaves . | |
| 1,135,989 | 4/1915 | Breach . | |
| 1,507,225 | 9/1924 | Barrett | 30/249 |
| 2,184,332 | 12/1939 | Bernay . | |
| 2,753,630 | 7/1956 | Shoemaker . | |
| 4,374,600 | 2/1983 | van Zelm . | |
| 4,677,748 | 7/1987 | Kobayashi . | |
| 4,760,645 | 8/1988 | Davis | 30/249 |
| 5,020,222 | 6/1991 | Gosselin et al. . | |
| 5,084,975 | 2/1992 | Melter | 30/249 |
| 5,317,806 | 6/1994 | Held et al. . | |
| 5,347,800 | 9/1994 | Morgan . | |
| 5,570,510 | 11/1996 | Lindén . | |
| 5,634,276 | 6/1997 | Lin | 30/249 |

FOREIGN PATENT DOCUMENTS

| | | |
|---|---|---|
| 0278838 | 8/1988 | European Pat. Off. . |
| 1185863 | 3/1970 | United Kingdom . |
| 2100648 | 1/1983 | United Kingdom . |

*Primary Examiner*—Douglas D. Watts
*Attorney, Agent, or Firm*—Foley & Lardner

[57] ABSTRACT

A lopper used to perform lopping, pruning and similar operations includes a lopping head provided with a spring-biased blade cooperating with a jaw, a drive mechanism, and an elongate housing. The drive mechanism includes first and second wheels rotatable relative thereto about a first axis. A head line couples the first wheel to the blade at a connecting point, and the second wheel is coupled to a driving line. The first wheel is eccentric relative to the second wheel so that a distance separating a region of a guiding surface of the first wheel from the first axis is smallest at a predetermined point of blade travel across the bight. The lopper also includes an intermediate handle and a lower handle selectively operable to actuate the blade relative to the jaw.

22 Claims, 7 Drawing Sheets

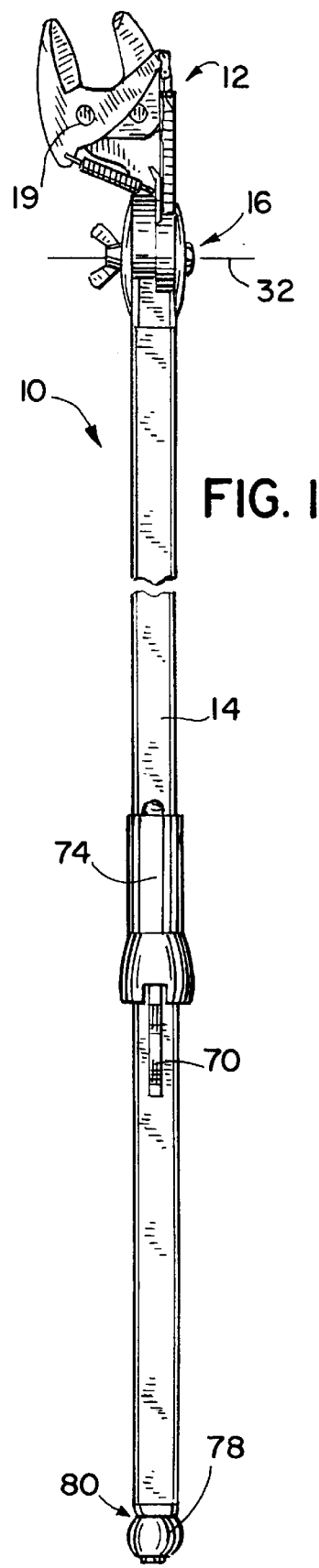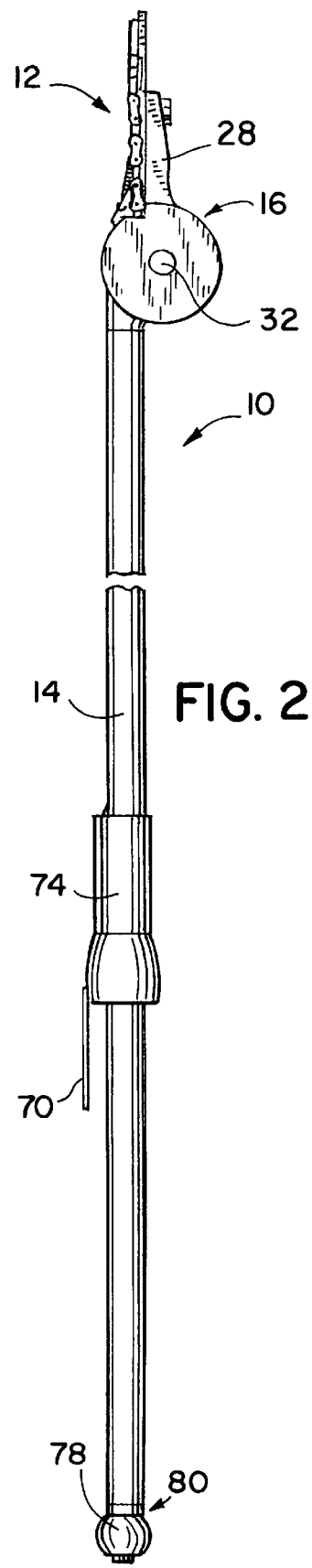

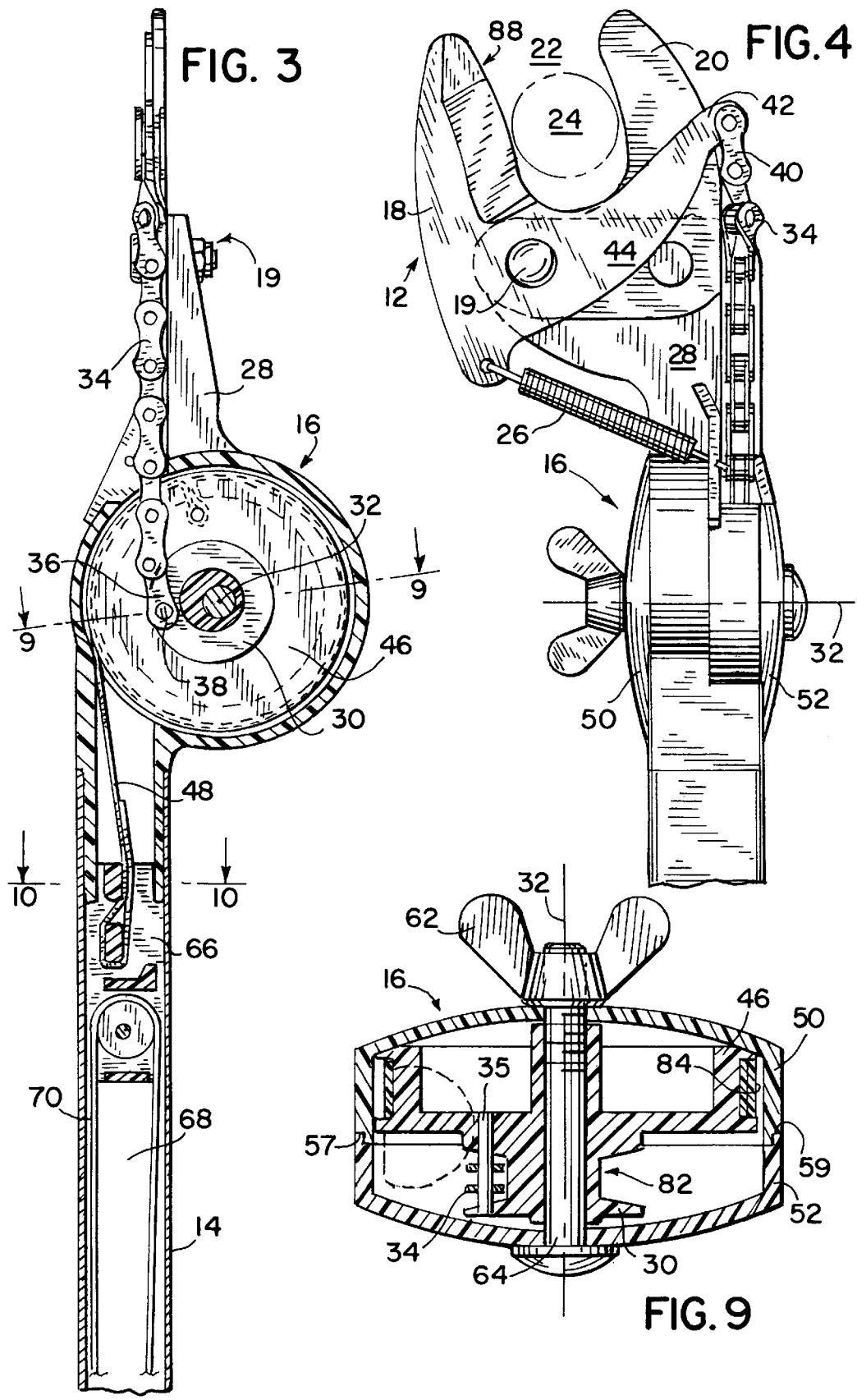

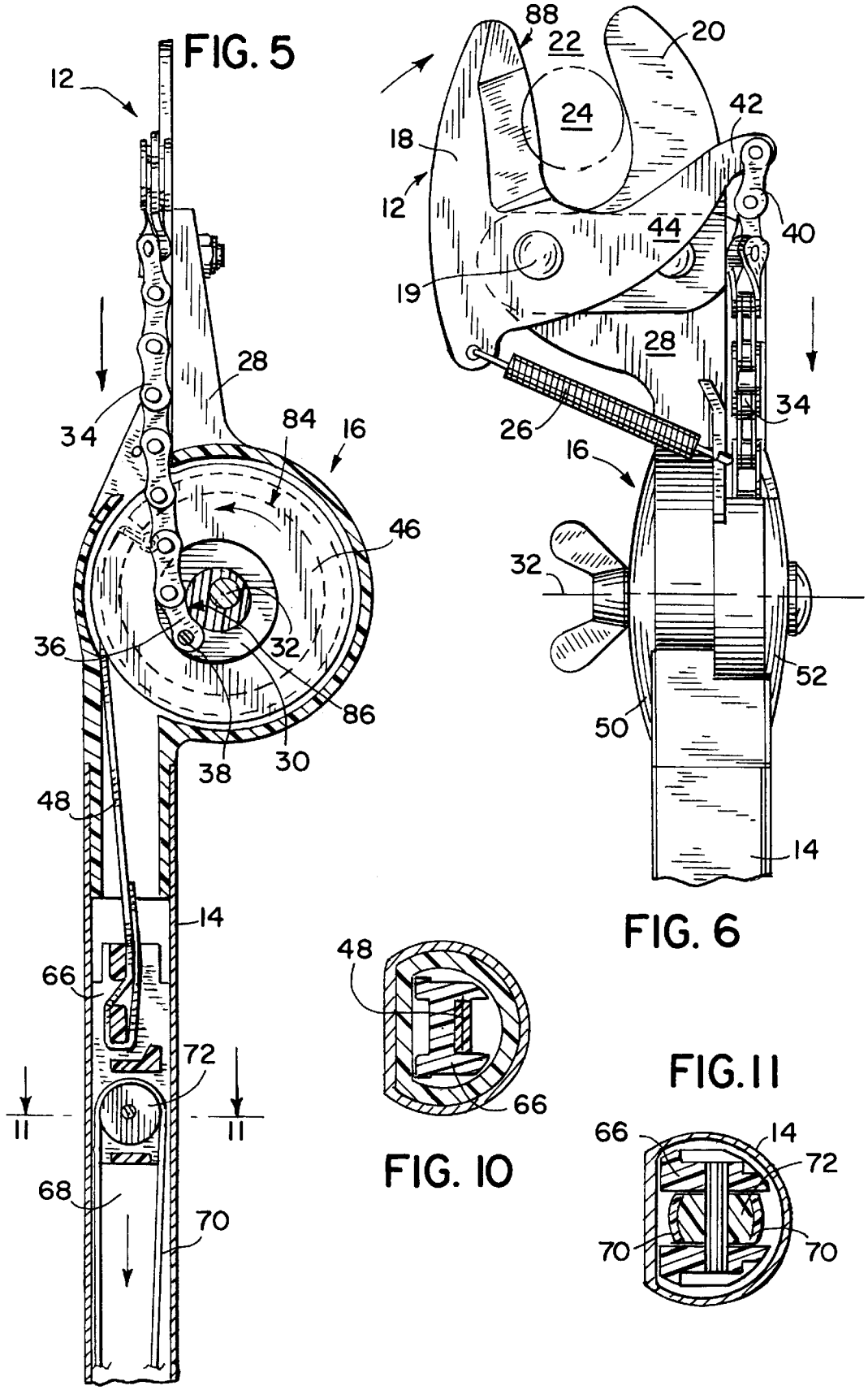

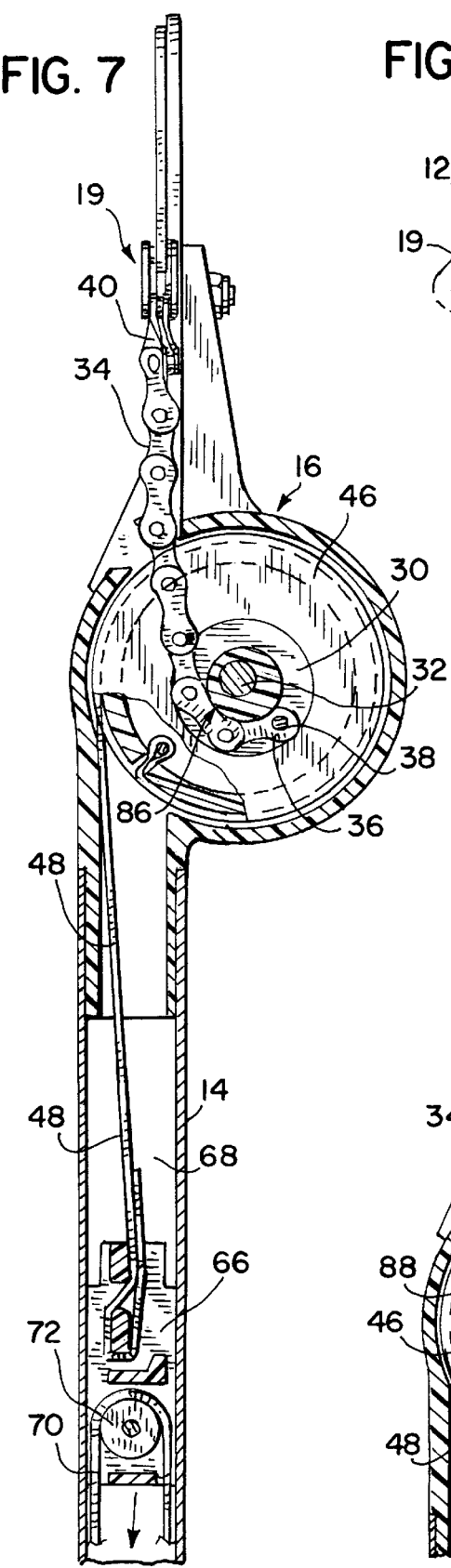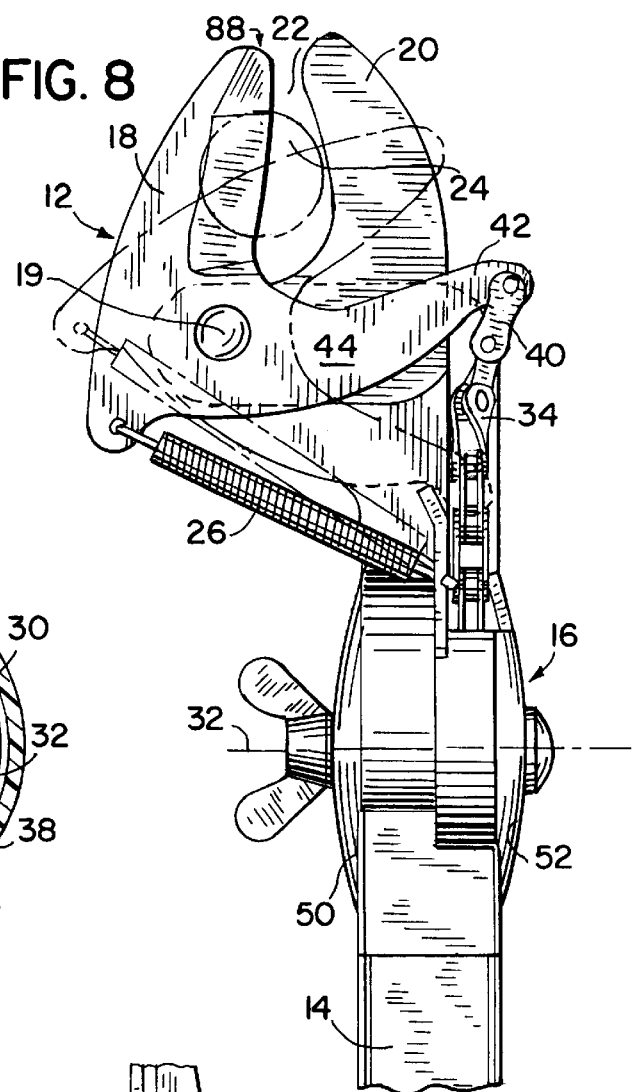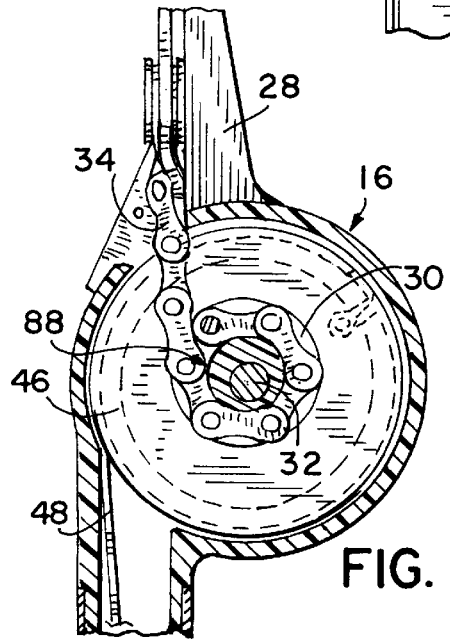

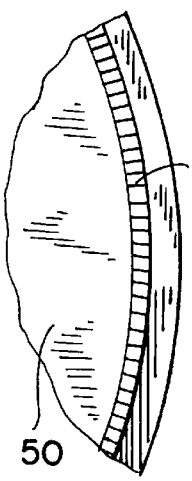
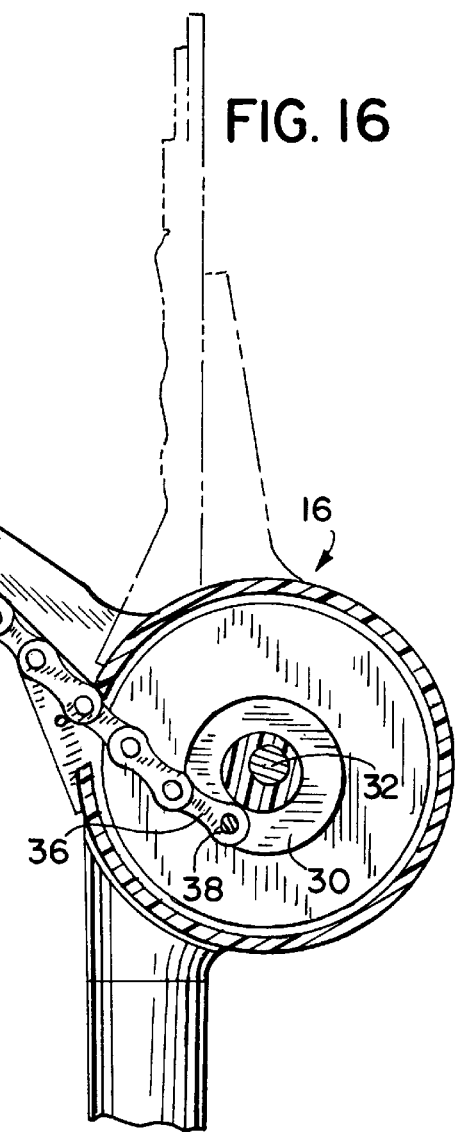
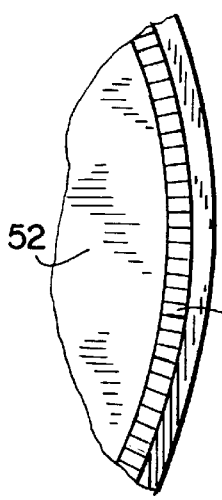
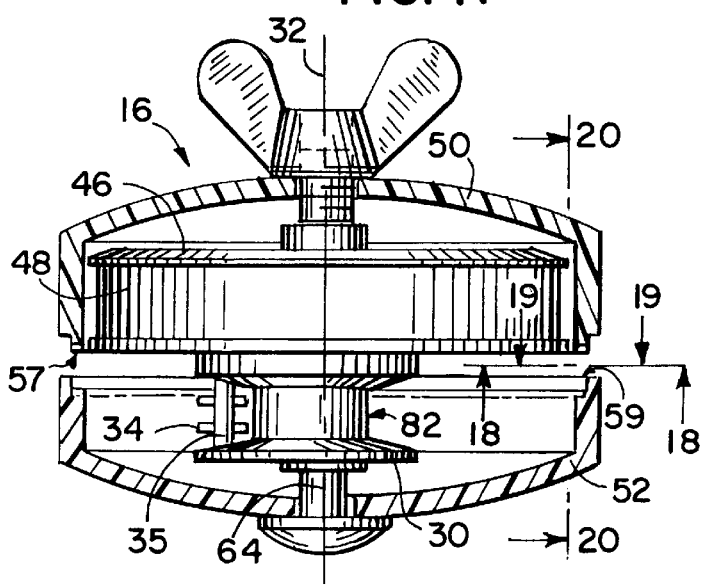
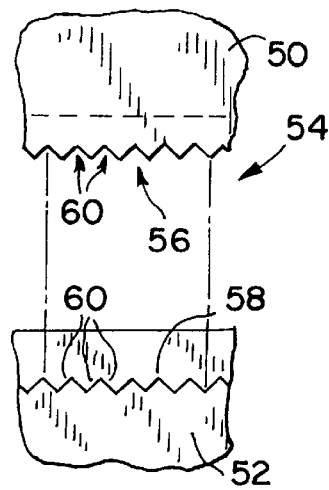

LOPPER

FIELD OF THE INVENTION

The present invention relates generally to the art of cutting tools, and particularly to shearing devices such as loppers.

BACKGROUND OF THE INVENTION

Lopping shears having a pair of elongated members disposed for cooperative engagement about a pivotable joint are widely used. Each of such members generally comprises a jaw, typically made of stamped or forged metal or other suitable material, having an opposed force-applying end connected to a handle. In anvil-type loppers, one of the jaws is formed as a blade while the other jaw is configured as an anvil.

Shearing heavy growth such as tree limbs on the order of two inches in diameter requires considerable force. To provide additional leverage, lopping shears are often provided with extra long handles. Such configuration gives the user the extra leverage required to perform the desired cutting operation, and the extended reach to trim distant tree branches and the like. Although these handles have often been made of wood, to reduce forearm fatigue, more recent prior art loppers have included hollow handles made of fiberglass or other suitable material, as disclosed in U.S. Pat. No. 5,570,510 naming the present inventor.

However, in certain cases some of these prior art loppers may still be relatively awkward to manipulate, particularly in areas heavily congested by branches of trees or plants to reach a limb to be trimmed. This is because this congestion typically prevents the user from opening the handles as needed to place the blades (or the blade and anvil) about the heavy growth to be severed. In addition, the various components of these prior art loppers, which are typically exposed, are also prone to getting caught in dense foliage areas.

Some of these constraints have already been recognized and addressed by those skilled in the art. U.S. Pat. No. 5,020,222 to Gosselin discloses a compound action lopper in which an additional lever member connected to one of the jaws increases the cutting force transmitted to the jaws, thereby facilitating the cutting operation. Additional leverage is also provided by a device conceived by the present inventor and disclosed in pending U.S. patent application Ser. No. 08/702,122 filed Aug. 20, 1996.

As illustrated in FIG. 1A, those skilled in the tree trimming art have recognized that the resistance to cutting designated as F presented by a generally round, fibrous growth, such as for example a tree limb L, is not uniform but varies as a function of the penetration of the cutting blade B into the growth. The maximum resistance is typically reached at a point P approximately sixty percent through the cutting stroke. This is because, up to that point, the penetrating action of blade B into limb L results in the compression of an increasing number of fibers as blade B penetrates further into limb L, thereby increasing the density of limb L. As shown in FIG. 1, C represents the region of compression of the fibers of limb L, while F, represents the friction forces opposing the cutting force applied by a user. Beyond point P which is the point of maximum compression of the fibers, the resistance to the cutting action decreases as the blade begins cutting the fibers (illustrated as region S, where the growth begins being severed and, as a result, the resistance to the cutting action subsides until limb L is entirely severed). It therefore becomes advantageous for a cutting tool to be provided with a variable force mechanism that provides maximum leverage at the point in the cutting stroke corresponding to the maximum resistance to cutting.

While loppers of the type described in the foregoing suitably provide the additional leverage desired to perform the desired cutting function, it can be readily appreciated that in certain cases their use may still be rendered difficult by the heavy foliage surrounding a limb to be trimmed. Accordingly, it appears desirable to provide a lopper that can alleviate the problems associated with conventional items of that kind, i.e., which is more compact in use so as to facilitate certain trimming operations.

SUMMARY OF THE INVENTION

The present invention provides a particularly advantageous variable force cutting mechanism which is constructed to generate maximum mechanical advantage (i.e., maximum leverage) at the most desirable point through the cutting stroke, without, however, unduly augmenting the overall weight of the shears. As a result, the lopper in accordance with the present invention is designed to facilitate the caring of trees, plants, and the like, particularly in areas congested by heavy foliage.

In accordance with one aspect of the invention, the lopper includes a lopping head provided with a spring-biased blade cooperating with a jaw, a drive mechanism, and an elongate housing. The drive mechanism includes first and second wheels rotatable relative thereto about a first axis. A head line couples the first wheel to the blade at a connecting point. The first wheel is eccentric relative to the second wheel so as to increase leverage at a predetermined point of blade travel across the bight.

In accordance with another aspect of the invention, the blade includes an arm extending away from the pivot point, the arm being configured so as to further increase the mechanical advantage provided by the eccentric at the predetermined point of blade travel across the bight.

In accordance with a further aspect of the invention, the lopper is provided with a pair of handles selectively actuatable to displace the blade relative to the jaw.

In accordance with yet another aspect of the invention, the drive mechanism includes a pair of mating portions and an indexing means for relatively positioning the blade with respect to the elongate housing.

Other advantages of the present invention will become apparent from the detailed description given hereinafter. It should be understood, however, that the detailed description and specific embodiments are given by way of illustration only since, from this detailed description, various changes and modifications within the spirit and scope of the invention will become apparent to those skilled in the art.

BRIEF DESCRIPTION OF THE DRAWINGS

The preferred exemplary embodiment of the present invention will hereinafter be described in conjunction with the appended drawings, wherein like numerals denote like elements and:

FIG. 2 is a right side elevational view of the Lopper of FIG. 1;

FIG. 3 is a partial cross-sectional view of the lopping head and drive mechanism of the Lopper of the present invention, shown in the blade open position;

FIG. 4 is a partial front elevational view of the lopping head and drive mechanism of the Lopper of the present invention, as shown in FIG. 3;

FIG. 5 is a partial cross-sectional view of the lopping head and drive mechanism of the Lopper of the present invention, shown with the blade engaging a workpiece;

FIG. 6 is a partial front elevational view of the lopping head and drive mechanism of the Lopper of the present invention, as shown in FIG. 5;

FIG. 7 is a partial cross-sectional view of the lopping head and drive mechanism of the Lopper of the present invention, shown with the blade in about mid-way through its travel across the bight;

FIG. 8 is a partial front elevational view of the lopping head and drive mechanism of the Lopper of the present invention, as shown in FIG. 7;

FIG. 9 is a cross-sectional view taken along line 9—9 shown in FIG. 3;

FIG. 10 is a cross-sectional view taken along line 10—10 shown in FIG. 3;

FIG. 11 is a cross-sectional view taken along line 11—11 shown in FIG. 5;

FIG. 12 is a partial cross-sectional view of the drive mechanism of the Lopper of the present invention, shown with the blade at the end of its travel across the bight;

FIG. 16 is a partial cross-sectional view of the lopping head and drive mechanism of the Lopper of the present invention, shown with the lopping head rotated relative to the elongate housing;

FIG. 17 is a partial cross-sectional view of the drive mechanism of the Lopper of the present invention, showing the two mating portions of the drive mechanism;

FIG. 18 is a cross-sectional view taken along line 18—18 shown in FIG. 17, illustrating a portion of an intermeshing region;

FIG. 19 is a cross-sectional view taken along line 19—19 shown in FIG. 17, illustrating a portion of the other intermeshing region; and FIG. 20 is a cross-sectional view taken along line 20—20 shown in FIG. 17, illustrating the intermeshing regions of the two mating portions of the drive mechanism.

DETAILED DESCRIPTION OF A PREFERRED EXEMPLARY EMBODIMENT

Figure 1A:
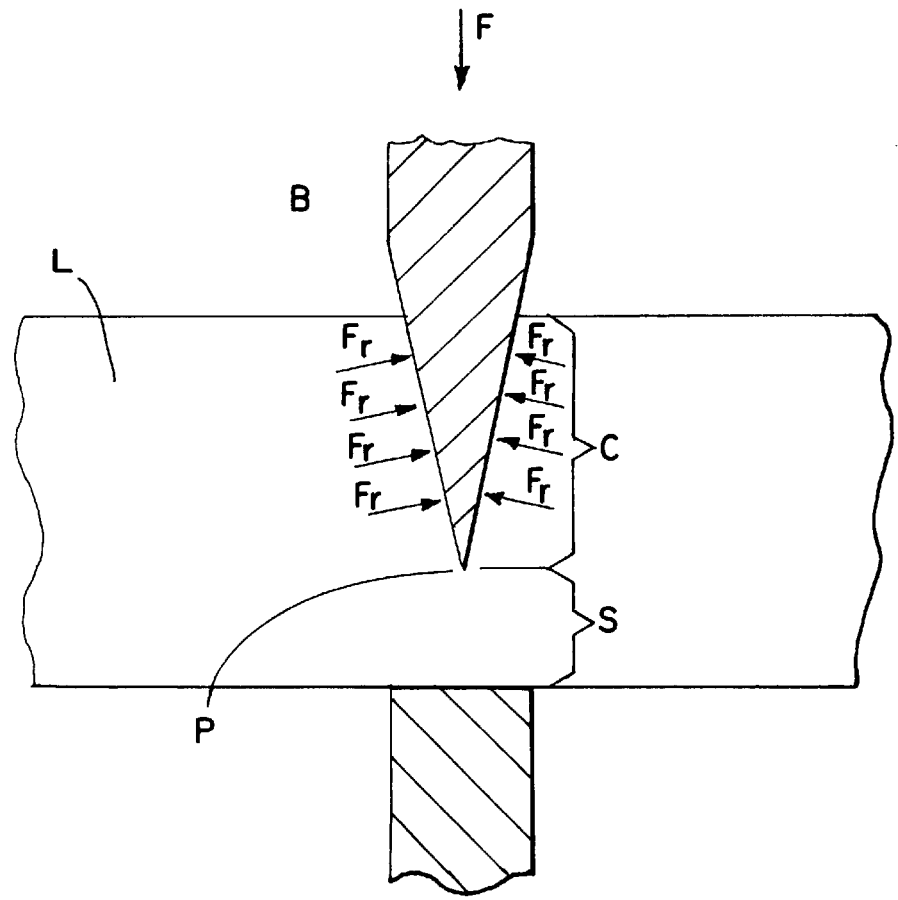
FIG. 1A shows, in schematic form, the penetration of a cutting blade into a growth, illustrating the point at which maximum resistance to the cutting action is typically reached.
Figure 1B:
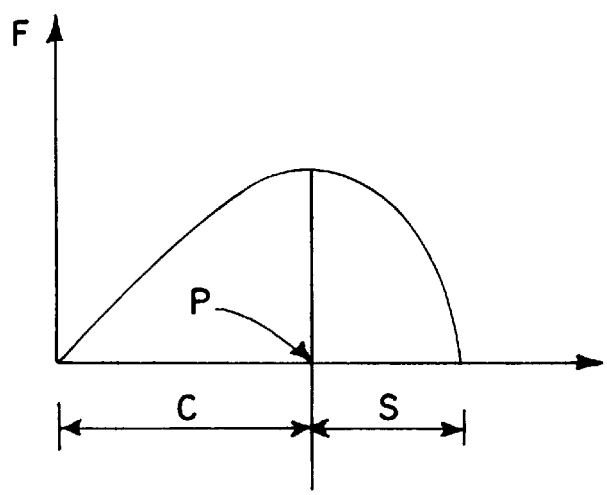
FIG. 1 is an elevational view of the Lopper of the present invention, the blade of the Lopper being shown open relative to the jaw.
Figure 13:
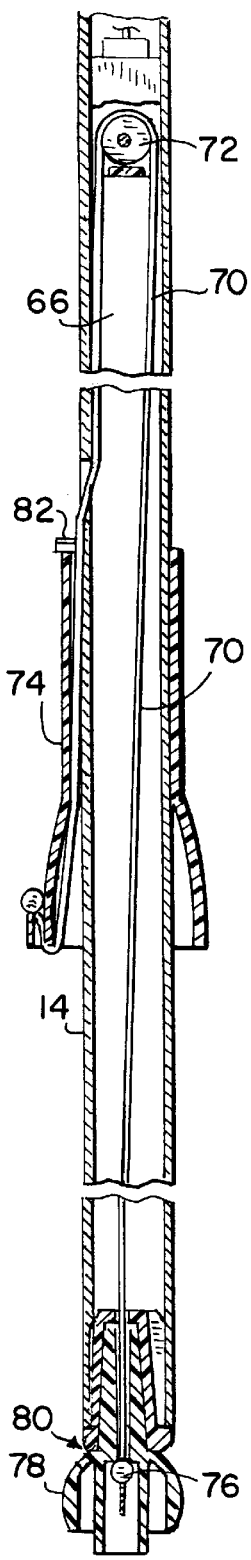
FIG. 13 is a front elevational view of a portion of the elongate housing of the Lopper of the present invention, the housing being associated with intermediate and lower handles.
Figure 14:
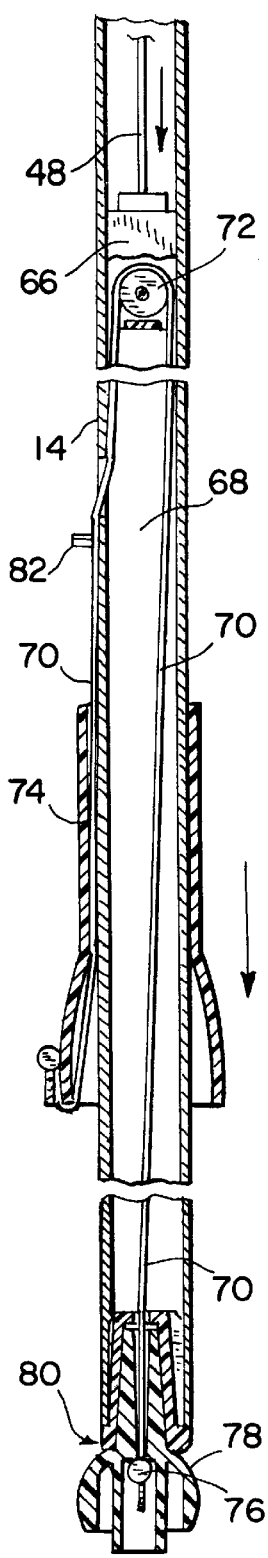
FIG. 14 is a front elevational view of a portion of the elongate housing of FIG. 13 shown with the intermediate handle being actuated.
Figure 15:
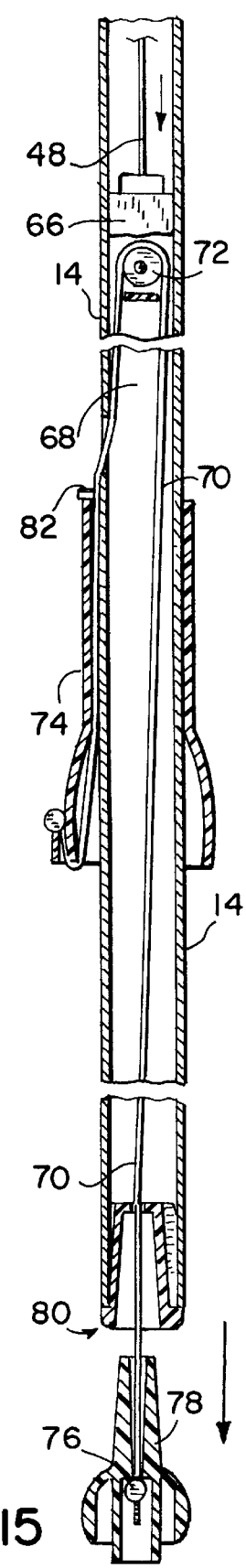
FIG. 15 is a front elevational view of a portion of the elongate housing of FIG. 13, shown with the lower handle being actuated.

The present invention relates to cutting tools such as loppers. However, while the invention as described herein will often be referred to a lopper, those skilled in the art will appreciate that the mechanism described herein and their principles of operation can be broadly applied to a wide variety of other cutting implements generally.

Referring to the Figures, a tool or lopper generally designated as 10 for performing lopping, trimming and pruning operations includes a lopping head 12, an elongate housing 14 and a drive mechanism 16 disposed intermediate head 12 and housing 14. Lopping head 12 includes a blade 18 pivotable about pivot point 19, and cooperating with a jaw 20 forming a bight 22 configured to receive a workpiece 24 to be severed by blade 18. A spring 26 biases blade 18 to the open position relative to jaw 20.

Turning now to drive mechanism 16, advantageously drive mechanism 16 is connected to lopping head 12 by having a portion 28 of mechanism 16 merging into jaw 20. Mechanism 16 includes a first wheel 30 rotatable relative to mechanism 16 about a first axis 32. First wheel 30 is coupled to blade 18 by a head line 34 (for example by means of a pin 35). As represented in the Figures, head line 34 is preferably a chain. Those skilled in the art will nevertheless readily appreciate that a rope, cable or strap could also suitably be used for head line 34. One end 36 of head line 34 is connected to first wheel 30 at a connecting point 38. The other end 40 of head line 34 is connected to a region 42 of an arm 44 of blade 18 extending away from pivot 19.

As more particularly shown in FIGS. 9 and 17, drive mechanism 16 also includes a second wheel 46 which is rotatable with first wheel 30. Second wheel 46 is coupled to a driving line 48. As shown in FIGS. 3, 5, 7, 9, 12, 16, and 17, first wheel 30 is eccentric relative to second wheel 46, thereby causing an increase in the force applied to workpiece 24 at a predetermined point of the travel of blade 18, as will be explained below.

To increase the flexibility of Lopper 10, drive mechanism 16 is formed of two mating portions 50, 52 selectively rotatable with respect to one another about first axis 32. This permits positioning of lopping head 12 relative to elongate housing 14. However, to increase retention of the position of lopping head 12 selected by the user, mating portions 50, 52 include an indexing means generally designated as 54. As shown in FIGS. 18–20, indexing means 54 includes intermeshing regions 56, 58, formed on oppositely facing surfaces 57, 59 of mating portions 50, 52. Intermeshing regions preferably include a plurality of teeth 60 which can be grouped in discrete segments. Alternatively, teeth 60 can be cincturing portions 50, 52. Also, other inter-engaging structures such as for example indexing fingers or the like could be used instead. Accordingly, when the user desires to reposition lopping head 12 relative to elongate housing 14, the user will simply loosen nut 62 sufficiently to disengage intermeshing regions 56, 58, and then rotate mating portions 50, 52 relative to one another. Upon reaching the desired position of head 12, the user will bring mating portions 50, 52 closer together so that regions 56, 58 re-engage. This new position of head 12 will be maintained by tightening nut 62 on head bolt 64.

Turning now to elongate housing 14, housing 14 is preferably hollow and tear-dropped shaped as shown in FIGS. 10 and 11. A slide block 66 is slidably received within an interior region 68 of housing 14. Slide block 66, which is coupled to second wheel 46 by driving line 48, is engaged by actuating line 70 passing over a pulley 72. Actuating line 70 is connected to an intermediate handle 74 which is slidable relative to housing 14. A distal end 76 of actuating line 70 is preferably connected to a lower handle 78 which is engageable with a lower end 80 of housing 14. It should be noted that rotation of lopping head. 12 relative to housing 14 will slightly displace the location of intermediate handle 74 along housing 14. However, intermediate handle 74 can be easily repositioned along housing 14 by adjusting the location of handle 74 on actuating line 70.

Housing 14 also includes a stop 82 formed thereon so that so a pulling force exerted on head line 34 by spring-biased blade 18 causing tensioning of actuating line 70 and also causes intermediate handle 74 to abut against stop 82. It can therefore be understood that a user may alternatively actuate intermediate handle 74 or lower handle 78 to cause blade 18 to travel across bight 22. In particular, when intermediate handle 74 is pulled down by the user, lower handle 78 engages lower end 80 of housing 14 and sliding block 66 is pulled down within region 68. Conversely, when lower handle 78 is pulled down, intermediate handle 74 engages stop 82 and sliding block 66 is pulled down within region 68.

The function of the eccentric configuration of first wheel 30 relative to second wheel 46 will now be explained by referring more particularly to FIGS. 7, 9, and 17. First wheel 30 includes a guiding surface 82 about which head line 34 is wound as first wheel 30 rotates about first axis 32. Similarly, second wheel 46 includes a second guiding surface 84 about which driving line 48 is wound as second wheel 46 rotates with first wheel 30. Because first wheel 30 is eccentric on first axis 32, guiding surface 82 is also eccentric relative to first axis 32 and relative to second guiding surface 84.

The eccentric construction as described in the foregoing causes a distance separating first axis 32 from a region 86 of guiding surface 82 where head line 34 ceases to engage guiding surface 32 to be smallest at a predetermined point of the travel of blade 18 across bight 22. As is well known in the art, work is required to sever workpiece 24 received in bight 22. It is also known that work applied to the work piece is equal to the work applied by a user less losses through the transmission mechanism. Neglecting transmission losses, the work applied by the user by downward movement of intermediate handle 74 or lower handle 78 is transmitted from second wheel 46 to first wheel 30 as the two wheel rotate together. Consistent with well known principles, the work at first wheel 30 (which is then applied to head line 34) is equal to the product of the distance separating first axis 32 from head line 34 by the force $F_t$ transmitted to head line 34 in the direction of head line 34. As can be readily appreciated (and again neglecting losses) since work is constant, at the point where the distance separating first axis 32 from head line 34 reaches a minimum, force $F_t$ reaches a maximum. In other words, because of the eccentricity of wheels 30 relative to wheel 46, in region 86 of guiding surface 82 where head line 34 ceases to engage guiding surface 32, force $F_t$ reaches a maximum due to the fact that the distance separating first axis 32 from head line 34 is smallest. According to the present invention, the configuration of first and second wheels 30, 46 relative to the travel of blade 18 minimizes such distance at predetermined point P falling at approximately sixty percent of the cutting stroke, thereby allowing lopper 10 to generate maximum leverage at that point, which is the point of the cutting stroke where the density of workpiece 24 is highest.

Drawing from the same principles, to further increase the force applied to workpiece 24 at point P, arm 44 of blade 18 is constructed relative to the cutting edge 88 of blade 18 so that at point P, as more particularly shown on FIG. 8, arm 44 will be substantially perpendicular to head line 34. As a result, all of $F_t$, (as opposed to only a portion thereof when head line 34 forms and angle with arm 44) will be transmitted to workpiece 24.

It is understood that the above description is of a preferred exemplary embodiment of the present invention, and that the invention is not limited to the specific forms described. For example, while the invention has been described in association with a device taking the form of a lopper, it can be used with other items as well. In addition, elongate housing and the slide block can take other shapes so long as they can be associated, and that the housing is configured to support the drive mechanism. Also, the first and second wheel can have other configurations while preserving their essential function that is described above. Nevertheless, it should be understood that these and other substitutions, modifications, changes and omissions may be made in the design and arrangement of the elements disclosed herein without departing from the scope of the appended claims.

I claim:

1. A lopper comprising:
    a lopping head having a spring-biased blade pivotally connected to a jaw about a pivot point, the jaw cooperating with the blade to sever a workpiece received in a bight formed by the jaw;
    a drive mechanism connected to the lopping head, the drive mechanism comprising a first wheel rotatable relative thereto about a first axis and coupled to the blade by a head line, the head line being connected to the first wheel at a connecting point so that the head line is wound about a guiding surface of the first wheel as the first wheel rotates about the first axis, the drive mechanism also comprising a second wheel rotatable with the first wheel; the second wheel being coupled to a driving line; and
    an elongate housing connected to the drive mechanism;
    wherein the first wheel is eccentric relative to the second wheel so that a distance separating the first axis from a region of the guiding surface where the head line ceases to engage the guiding surface is smallest at a predetermined point of blade travel across the bight.

2. The lopper of claim 1, wherein the blade includes an arm extending away from the pivot point, the arm being configured so that the arm and the head line are substantially perpendicular at the predetermined point.

3. The lopper of claim 1, wherein the head line and the driving line are selected from the group consisting of a chain, a cable, a rope, and a strap.

4. The lopper of claim 1, wherein the first wheel is configured so that the predetermined point is about sixty percent of the travel of the blade across the bight.

5. The lopper of claim 1, wherein the drive mechanism is selectively rotatable relative to the elongate housing about the first axis.

6. The lopper of claim 5, wherein the drive mechanism further comprises a pair of mating portions and an indexing means for relatively positioning the blade with respect to the elongate housing.

7. The lopper of claim 6, wherein the indexing means comprises intermeshing regions formed on oppositely facing surfaces of the mating portions.

8. The lopper of claim 7, wherein the intermeshing regions cincture the mating portions.

9. The lopper of claim 1, wherein the housing is teardrop-shaped.

10. The lopper of claim 1, wherein the elongate housing is substantially hollow and the lopper further comprises a slide block slidably received within an interior region of the housing and an actuating line substantially received within the housing and attached thereto, the slide block being coupled to the second wheel by the driving line, the slide block being engaged by the actuating line so that actuation of the actuating line causes pivotal movement of the blade relative to the jaw.

11. The lopper of claim 10, wherein the slide block includes a pulley guiding the actuating line therethrough.

12. The lopper of claim 10, wherein the actuating line is selected from the group consisting of a strap, a rope, and a cable.

13. The lopper of claim 10, wherein the actuating line is attached to an outer region of the housing.

14. The lopper of claim 1, wherein the elongate housing is substantially hollow and the lopper further comprises a slide block coupled to the second wheel by the driving line, the slide block being slidably received within an interior region of the housing and engaged by an actuating line connected to an intermediate handle slidable relative to the housing, the actuating line being tensioned by a force exerted on the head line by the spring-biased blade.

15. The lopper of claim 14, further including a stop formed on the elongate housing, the force causing the intermediate handle to abut against the stop when the blade is open relative to the jaw.

16. The lopper of claim 15, further including a lower handle attached to a distal end of the actuating line, the lower handle engageable with a lower end of the elongate housing such that the blade can be pivoted relative to the jaw by actuation of one of the intermediate handle and the lower handle.

17. A lopper comprising:

a hollow elongate housing;

a drive mechanism connected to the elongate housing; and a lopping head connected to the drive mechanism, the lopping head having a spring-biased blade cooperating with a jaw to sever a workpiece received in a bight formed by the jaw, the blade being pivotable about a pivot point upon actuation of a head line connecting the blade to the drive mechanism;

wherein the drive mechanism comprises first and second wheels rotatable relative thereto about a first axis, the second wheel being coupled to a driving line, the head line being connected to the first wheel at a connecting point so that the head line is wound about a guiding surface of the first wheel as the first wheel rotates about the first axis, and the first wheel being eccentric relative to the second wheel so that a distance separating the first axis from a region of the guiding surface where the head line ceases to engage the guiding surface is smallest at a predetermined point of blade travel across the bight.

18. The lopper of claim 17, wherein the blade includes an arm extending away from the pivot point, the arm being disposed relative to a cutting edge of the blade so that the arm and the head line are substantially perpendicular at the predetermined point.

19. The lopper of claim 17, wherein the lopping head is indexable relative to the elongate housing.

20. A lopper, comprising:

a lopping head having a spring-biased blade pivotally connected to a jaw about a pivot point, the jaw cooperating with the blade to sever a workpiece received in a bight formed by the jaw;

drive mechanism connected to the lopping head, the drive mechanism comprising a first wheel rotatable relative thereto about a first axis and coupled to the blade by a head line, the head line being connected to the first wheel at a connecting point, the drive mechanism also comprising a second wheel rotatable with the first wheel, the second wheel being coupled to a driving line;

an elongate housing connected to the drive mechanism; and means for imparting a variable cutting force to the workpiece as the blade travels across the bight, the variable cutting force increasing to a predetermined point of travel of the blade across the bight when a constant force is applied to the driving line.

21. The lopper of claim 20 wherein the imparting means comprises the first wheel having a guiding surface about which the head line is wound as the first wheel rotates about the first axis, and the second wheel having a second guiding surface about which the driving line is wound as the second wheel rotates with the first wheel, the guiding surface being eccentric relative to the second guiding surface so that a distance separating the first axis from a region of the guiding surface where the head line ceases to engage the guiding surface is smallest at a predetermined point of blade travel across the bight.

22. The lopper of claim 20, wherein the lopping head is indexable relative to the elongate housing.

* * * * *